R. P. CALLARD.
SHEET GLASS DRAWING MECHANISM.
APPLICATION FILED AUG. 11, 1919. RENEWED MAY 31, 1921.
1,402,145.
Patented Jan. 3, 1922
4 SHEETS—SHEET 1.
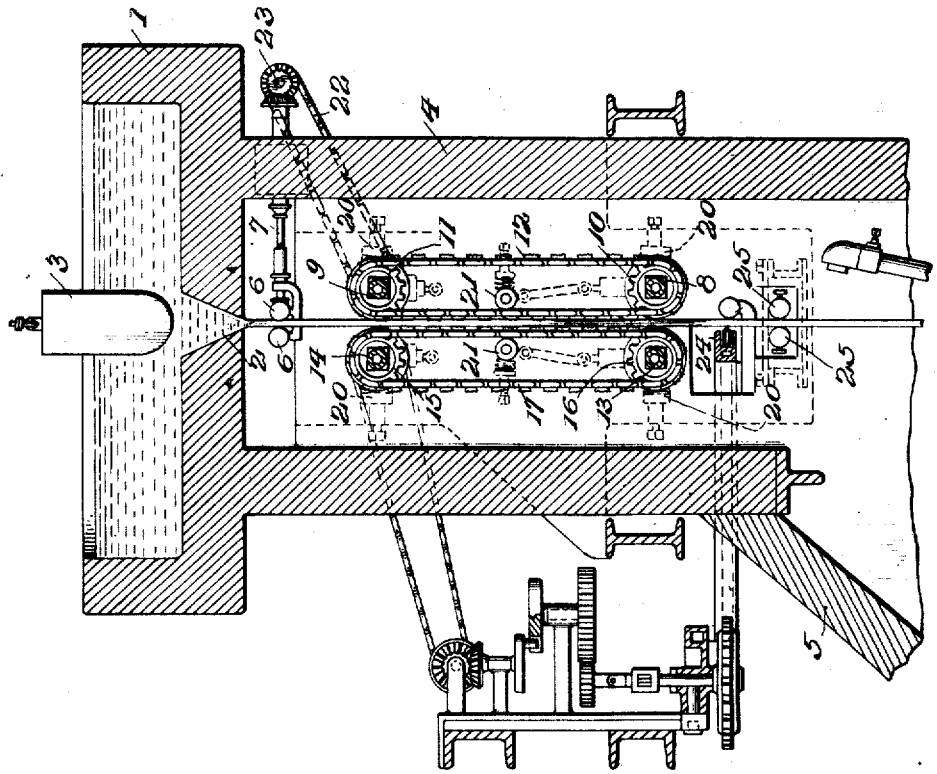

R. P. CALLARD.
SHEET GLASS DRAWING MECHANISM.
APPLICATION FILED AUG. 11, 1919. RENEWED MAY 31, 1921.
1,402,145.
Patented Jan. 3, 1922.
4 SHEETS—SHEET 2.
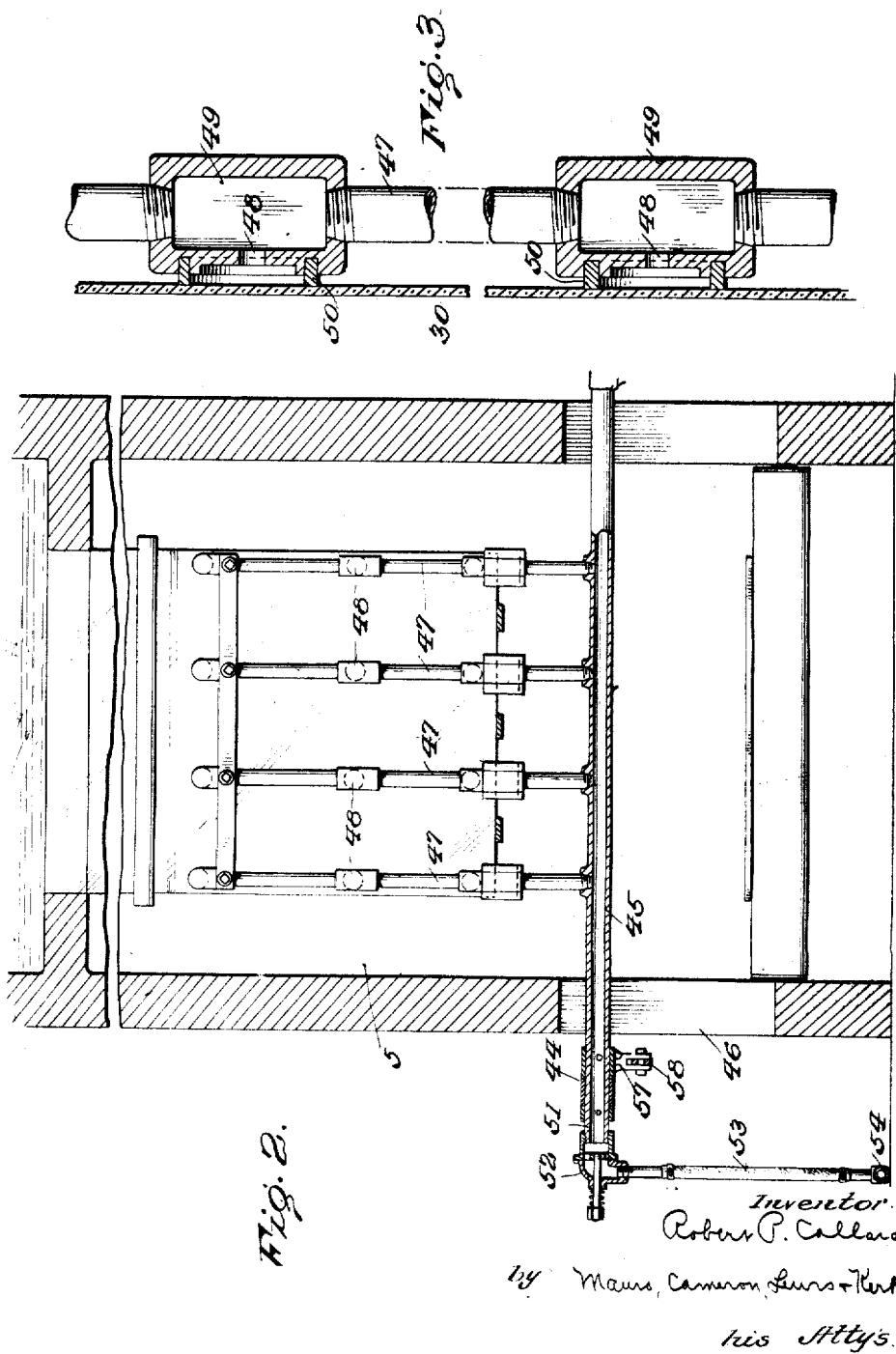

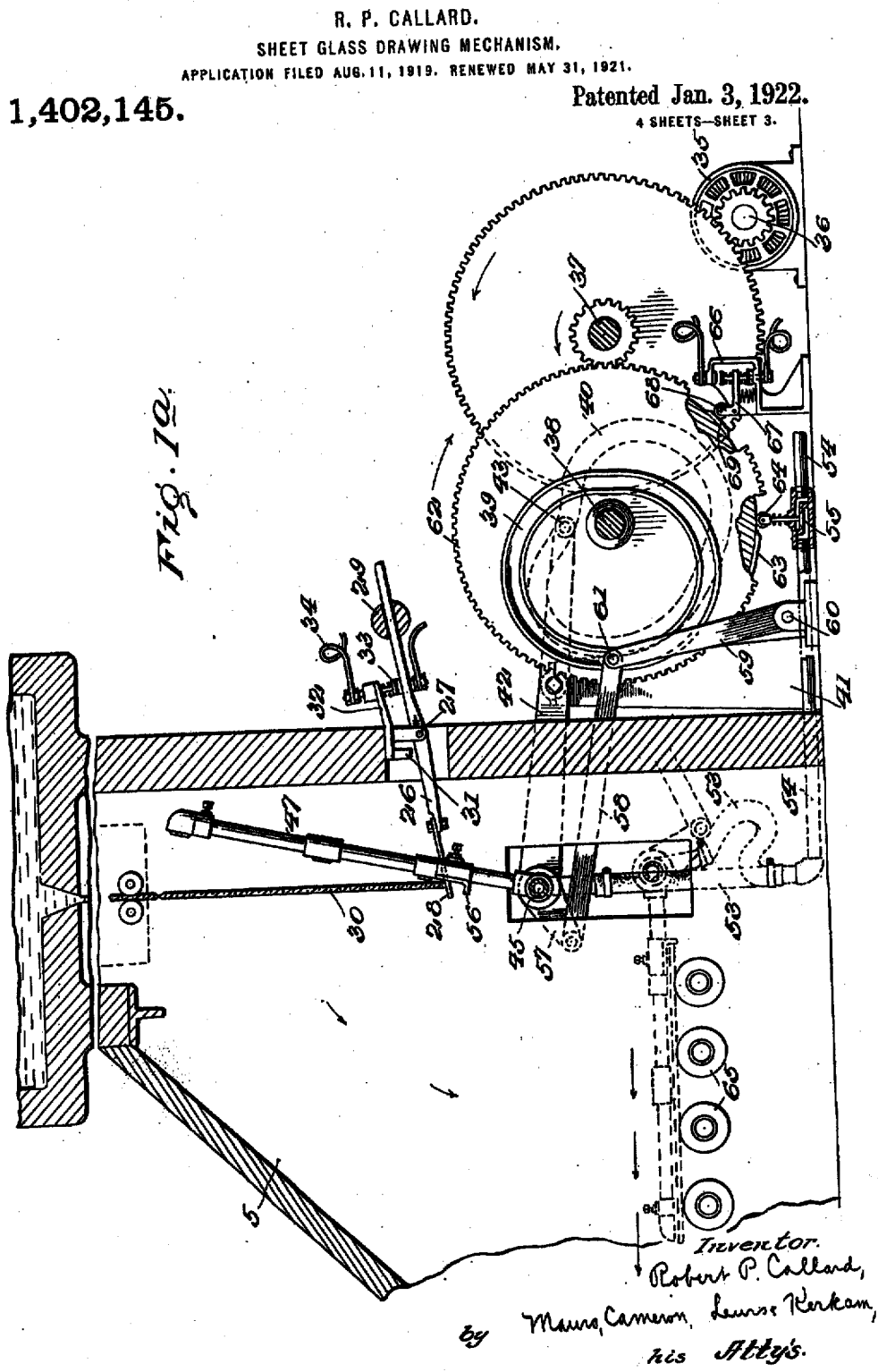

R. P. CALLARD.
SHEET GLASS DRAWING MECHANISM.
APPLICATION FILED AUG. 11, 1919. RENEWED MAY 31, 1921.
1,402,145.
Patented Jan. 3, 1922.
4 SHEETS—SHEET 4.
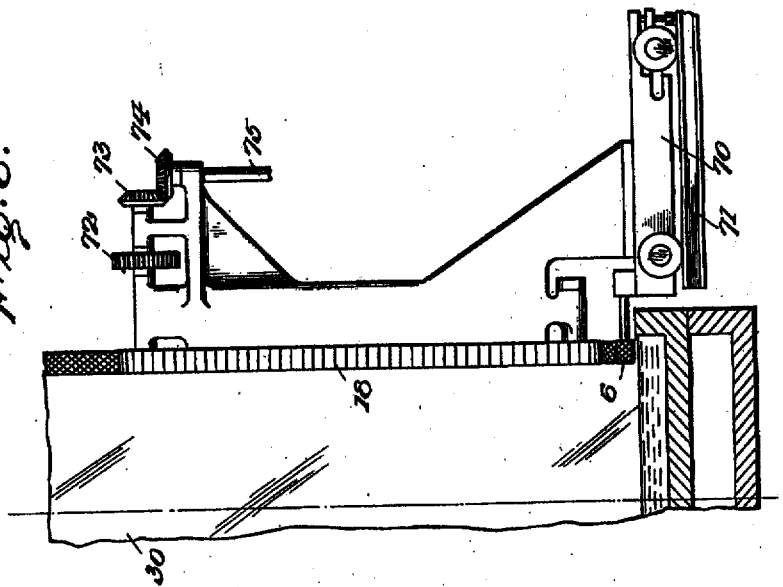
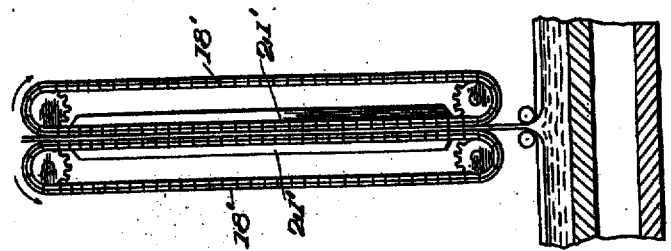
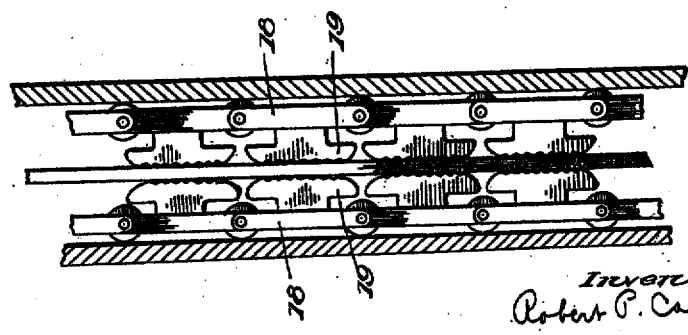
Inventor.
Robert P. Callard
by Mauro, Cameron, Lewis & Kirkam,
his Atty's.

UNITED STATES PATENT OFFICE.

ROBERT P. CALLARD, OF CHARLESTON, WEST VIRGINIA, ASSIGNOR TO THE LIBBEY-OWENS SHEET GLASS COMPANY, OF TOLEDO, OHIO, A CORPORATION OF OHIO.

SHEET-GLASS-DRAWING MECHANISM.

1,402,145.  Specification of Letters Patent.  Patented Jan. 3, 1922.

Application filed August 11, 1919, Serial No. 316,638. Renewed May 31, 1921. Serial No. 473,776.

*To all whom it may concern:*

Be it known that I, ROBERT P. CALLARD, a citizen of the United States of America, and a resident of Charleston, West Virginia, have invented a new and useful Improvement in Sheet-Glass-Drawing Mechanism, which invention is fully set forth in the following specification.

This invention relates to the art of drawing sheet glass, and has for its object to provide mechanism for continuously drawing a sheet of glass, automatically dividing it into sections, and delivering the sections automatically to a leer for annealing. My present invention is an improvement on that shown, described and claimed in my application Sr. No. 308,970, filed July 7, 1919, and is designed more particularly to simplify the mechanism for transferring the severed sections of the sheet of glass to the annealing leer, to improve the construction of the chains whereby the sheet of glass is gripped and drawn, and certain other details of construction that will be hereinafter described.

For the purpose of illustrating one form which the invention may assume, reference is had to the accompanying drawings, which drawings, however, are for the purpose of illustration only and not for defining the limits of the invention, reference being had to the appended claims for this purpose.

In said drawings—

Fig. 1 is a cross-section of the upper portion of the machine showing the forehearth of the furnace, the drawing mechanism, and the severing mechanism;

Fig. 1ª is a cross-sectional elevation showing the lower portion of the machine, together with the entrance to the leer, the means for operating the transfer device, and said device itself being shown in elevation;

Fig. 2 is a rear elevation of the means for transferring the severed sections of glass from the vertical to the horizontal position and delivering the same to the leer rollers;

Fig. 3 is an enlarged sectional detail showing the specific construction of said transfer device;

Fig. 4 is a detail of the drawing chains showing the specific construction of the grippers thereon;

Fig. 5 is a detailed view showing how said chains may be utilized for drawing the glass vertically upward instead of downward as shown in Fig. 1; and Fig. 6 is a detail illustrating one means for mounting said chains for upward drawing so that the same may be advanced toward or from the side of the forehearth containing the molten glass.

Referring to the drawings in which like reference numerals indicate corresponding parts throughout the several views, 1 is a forehearth of any suitable glass-melting furnace, provided with an opening 2 formed in the bottom thereof, which opening, as shown, is widest at its top and tapers to a slot at its bottom, through which slot molten glass is permitted to flow during the drawing operation. Said slot may be closed by means of a plug 3 when the device is not in operation. This plug 3 is provided with any suitable means for raising and lowering the same in order to effect the control of the flow of molten glass through the slot 2. Any suitable means, such for example as those shown in my aforesaid application, may be employed for controlling the temperature of the glass flowing through the slot 2; but as the same form no part of the present invention they are not herein illustrated. As the glass flows through the slot 2, it enters a chamber 4 which may, if desired, be provided with burners or other suitable means for controlling the temperature thereof. This chamber 4 constitutes an upward extension of the end 5 of the annealing leer. Immediately beneath the forehearth, and in the upper portion of the chamber 4, is placed a pair of side holding rolls 6, 6 on each side of the machine, so positioned as to grip the edge portions only of the sheet to overcome the narrowing tendency of the sheet. These rolls may be of any suitable construction, such for example as the knurled rolls shown in my previous application, and are geared together in any suitable manner and driven by a shaft 7 suitably geared to a moving part of the mechanism.

After the sheet has passed the edge-gripping rolls 6, 6, the edge portions of the sheet are gripped and the sheet is drawn downwardly by suitable drawing mechanism in the form of a pair of chains whose inner flights, adjacent the sheet, move downward and are provided with grips for seizing the thickened edge portions of the sheet of glass. There is a pair of these chains adjacent each edge of the sheet and, as the construction of the two pairs is identical, a description of one will suffice for both. 8 is a power shaft mounted in chamber 4 and connected to any suitable source of power. 9 is a second shaft immediately above and in alinement with shaft 8. Said shafts 8 and 9 are provided with sprocket wheels 10 and 11 over which passes the sprocket chain 12. 13 and 14 are shafts on the oposite side of the sheet of glass from the shafts 9 and 10, provided with sprocket wheels 15 and 16 over which passes a sprocket chain 17. Shaft 14 is geared to shaft 9 from which it follows that all of the shafts 8, 9, 13 and 14 are driven from the same power source. The preferred form of construction of the chains is illustrated in detail in Fig. 4, wherein the links 18 of the chains are shown as provided with grip members 19 to seize the edge portions of the sheet and, as shown in Fig. 1, since the motion of the machine is such as to direct the inner flights of the chains in a downward direction, they serve to draw the sheet vertically downward. If desired, the gripping devices at the outer edges of the sheet may be connected together by suitable connections extending entirely across but out of contact with the face of the sheet. The several shafts 8, 9, 13 and 14 are mounted in yieldable bearings 20 which may be adjusted in any suitable manner and the centers of the chains between the upper and lower sets of shafts are provided with adjustable bearing blocks 21 for the purpose of holding the inner flights of the chains in intimate gripping contact with the sheet. The sprocket chain 22 extends from the shaft 9 to a shaft 23 through which power is applied to the shaft 7 for driving the grip rolls 6, 6.

As the glass emerges from between the grip chains, it is scored by any suitable scoring device 24. The specific construction of this scoring device forms no part of the present invention and therefore need not be specifically described herein. Preferably, it is of the construction shown and described in U. S. application by Busard, Serial No. 270,323, filed January 9, 1919, the same being an intermittently operating scoring device which, at stated intervals, effects a transverse score across one face of the sheet of glass. While the scoring device shown in said Busard application is preferred, any other suitable automatically operating scoring device may be employed.

After the glass passes the scoring device 24, it passes between adjustable idle rolls 25, 25 and continues to descend until its lower edge contacts with a counter balanced lever 26 (Fig. 1ª) fulcrumed at 27 in an opening formed in the wall of the chamber 5 and having an inner end 28 projecting into the path of the descending glass, while the outer end is provided with an adjustable counterweight 29. This counterweight acts to elevate the end 28 of the lever until contact is made between the lower edge of the descending sheet 30 and said lever, when the weight of the sheet acts to depress the lever. A stop 31 limits the upward movement of the inwardly projecting end 28 of the lever 26 under the influence of the weight 29 when not in contact with the sheet 30.

Mounted in a bracket 32 on the framework of the machine and above the outwardly projecting arm of the lever 26 is an electrical contact 33 which is connected by a suitable conductor 34 with the motor 35. The motor shaft 36 is connected by suitable gearing with a shaft 37 which in turn is suitably geared to a cam shaft 38, on which shaft 38 are secured two cams 39 and 40, the former being shown in full lines in Fig. 1ª and the latter in dotted lines. These cams are in the form of grooves to receive and actuate suitable rollers in a well known manner.

Fulcrumed on a suitable standard 41 is a lever 42 on one end of which is a roller 43 engaging in the cam groove 40. On the opposite end of the lever 42 from the roller 43, the lever 42 is provided with a sleeve 44, Fig. 2, supporting a rigid metal pipe 45 projecting through an open slot 46 in the wall of the chamber 5. Mounted on this pipe 45 within the chamber 5 is a series of upwardly projecting pipes 47, each of the pipes at its lower end being in open communication with the pipe 45. Each of the pipes 47 is provided with a series of openings 48, here shown as three, in each pipe, one near the top portion, one near the bottom portion, and one intermediate top and bottom. The specific construction of these openings is best shown in Fig. 3 in which the pipe 47 is shown as connected to chambers 49 in each of which an opening 48 is located, and surrounding said opening is a flexible cup 50 of any suitable material that will withstand the heat and effect an airtight contact with the sheet of glass 30. Preferably, said cups 50 are formed of asbestos.

Referring again to Fig. 2, the extreme outer end 51 of the pipe 45 enters a valve chamber 52 in the form of an elbow, to which chamber there is also connected a flexible pipe 53, which may be a suitable hose, extending downward where it is suitably connected to a pipe 54 leading to an air exhaust of any suitable construction, not shown. In the pipe 54 there is located a normally closed air valve 55 (Fig. 1ª). The construction of the whole is such that, when the air valve 55 is opened, the air is exhausted from the pipes 54, 53, 45 and 47, hence creating a suction through the openings 48. Each of the pipes 47 is provided with a ledge or bracket 56 (Fig. 1ª) for receiving the lower edge portion of the sheet of glass 80 after it has depressed the lever 26, which lever projects between two of the pipes 47.

The pipe 45 can turn freely in the sleeve 44. Rigidly connected to the pipe 45 is a crank arm 57 (Fig. 1ª) which is connected by a link 58 with a rocking lever 59 fulcrumed at 60 on the base of the machine, a cam roller 61 being located at the point of connection between the lever 58 and the lever 59 and entering the cam groove 39.

On one face of the large gear 62, bearing the cam grooves 39 and 40, is provided a valve-operating projection 63 (Fig. 1ª) which engages a spring-pressed roller 64 on the stem of the valve 55 so that, at the instant the device is started, the stem of the valve 55 is depressed and the latter is opened, thereby inaugurating suction through the openings 48 in the pipes 47.

When the motor is set in motion by closing the contact 33 (this being due to the action of the sheet of glass in depressing the inner end 28 of the lever 26), the cam 40 acts to depress the end of the lever 42 bearing the sleeve 44 and with it the pipe 45 and the pipes 47. At the same time the suction valve 55 is opened and the cam 39 acts to rock the crank 57 so as to turn the pipes 47 from an approximately vertical position to the horizontal position shown in dotted lines in Fig. 1ª. The hose 53 yields to permit the depressing action of the lever 42 and the glass is supported by the suction through, and the air-tight closure of, the cups 50 until it reaches the horizontal position where the sheet of glass is laid upon the leer rolls 65 which are continuously moving and acting to advance the sheet into and through the leer. Just at the instant that the sheet reaches the horizontal position, the suction valve 55 is closed by the roller 64 passing off of the ledge 63, the suction is broken in any suitable manner, and the glass is free.

As the sheet of glass passes off of the end 28 of the lever 26, the counterweight 29 brakes the electrical connection 33 and this would stop the machine if means were not supplied for continuing the supply of current to the motor. For this purpose there is provided a normally open electrical contact conveying current to the motor shown at 66. A spring-pressed bell-crank lever 67 has one arm controlling said contact and a second arm 68 is provided with a roller contacting with a lug or projection 69 on the face of the gear 62. When the motor is at rest, said lug 69, acting through the arm 68 of the lever, depresses the arm 67 and opens the contact 66, but, as soon as the roller passes off of the lug 69, the contact is closed through the action of the spring-arm 67. When the contacts 33 and 66 are open, the machine is at rest. When, however, the contact 33 is closed, the motor is started, the roller passes off of the lug 69 and the sheet of glass passes off of the end 28 of the lever 26. This acts to open the contact 33 and close the contact 66 so that current continues to pass to the motor. When the motor has made one complete revolution, the lug 69 again contacts with the roller 68, opens the contact 66, and the machine is brought to rest, any suitable electrically-controlled brake mechanism being provided to prevent overthrow.

During this complete revolution of the machine, the suction cups 50 have been brought into contact with the face of the sheet of glass, the series of pipes 47 have been lowered into horizontal position, the suction broken, the sheet of glass delivered to the leer rollers 65, and the parts returned from horizontal position to the position shown in full lines in Fig. 1ª, ready to receive the next severed section of the sheet.

It will thus be seen that the vacuum carrier has a vertically reciprocating movement and an oscillating movement. The necessity for the vertically reciprocating movement lies in the fact that, during the time that the vacuum carrier is engaged in delivering one section of the sheet of glass to the leer carrier, the machine is continuously drawing and feeding a sheet of glass downward and, if the vacuum carrier had only an oscillating movement, the upper portion of the carrier could not get to the rear of the sheet, the latter having descended into its path. But, by combining the vertically reciprocating and oscillating movements, the carrier is enabled to deliver one section of the sheet of glass and return to its position to the rear of the next descending section. To accomplish this purpose, the cam grooves 39 and 40 are so constructed that the first movement of the vacuum carrier from its normal practically upright position is an oscillating movement whereby the suction is established and the section broken off. From this point onward, the downward movement of the pipe 45 under the influence of the lever 42 takes place simultaneously with the oscillating downward movement of the carrier. The sheet having been delivered to the leer carrier by the vacuum carrier, the latter is then turned from its horizontal to its upright position and the pipe 45, together with the carrier, is then elevated by the lever 42 so as to bring the upper end of the vacuum carrier to the rear of the next descending section of glass and in position to receive said section and repeat the operation.

It will be understood that there are two of the levers 42, one supporting either end of the pipe 45, the second lever 42 not being shown at the right-hand side of Fig. 2, the parts being broken away for compactness of illustration.

While in the particular form of sheet-glass drawing machine illustrated in Figs. 1, 1ª and 2, the sheet is drawn downward from a forehearth located above the drawing mechanism, it will be apparent that the drawing chains may be located above the molten glass in the forehearth and operated to draw the sheet upward therefrom. Such construction is shown in Fig. 5, in which the chains 18' are shown with their inner flights moving vertically upward instead of vertically downward as in Fig. 1, the supports for holding the inner flights of the chains in intimate contact with the sheet being here shown in the form of bars 21'.

When the chains are thus used for drawing the glass vertically upward, the same may be mounted upon a car 70 (Fig. 6) running on a track 71, power being applied through the gear 72 to the chains and through the bevel gears 73 and 74 to the shaft 75 through which power is applied to the edge-holding rolls 6.

It will be observed that the chains in either one of the embodiments engage only the edge portions of the sheet. These edge portions are knurled or roughened through the action of the edge-holding rolls 6, 6, and are cut off from the finished sheet.

By means of the present invention it will be seen that I have provided an efficient and simple form of carrier for transferring the severed sections of the sheet from the drawing mechanism to the leer without any danger of marring the fine fire finish of the sheet, and that the drawing mechanism itself, as embodied in the drawing chains, engages only that portion of the sheet which it is not designed to have enter into the finished product and which has already been roughened or marred by the edge-holding rolls, so that the drawing chains are in no danger of marring or injuring the fine fire finish of the sheet surface.

What is claimed is:—

1. In a sheet glass drawing machine, an oscillating vertically reciprocating vacuum carrier receiving sections of the drawn glass from the machine in an upright position and depositing the same on a second carrier in horizontal position.

2. In a sheet glass drawing machine, a carrier, means delivering sections of sheet glass to the carrier, and suction devices holding the sections on the carrier.

3. In a continuous sheet glass drawing machine, the combination of sheet-severing means, a carrier for removing the severed sections, and suction devices to hold the same on the carrier.

4. In a sheet glass drawing machine, the combination of means for continuously drawing a sheet of glass, means severing the sheet into sections, a carrier receiving the severed sections, a leer, and suction devices holding the sections on the carrier as the latter transfers said sections to the leer.

5. In a sheet glass drawing machine, a tubular carrier for receiving sections of the drawn sheet, cups surrounding openings in said tubular carrier and against which cups said sections rest when on the carrier, means for exhausting the air from the carrier tubes whereby suction is created to hold the glass on the carrier, and means automatically breaking said suction at a predetermined time.

6. In a sheet glass drawing machine, an approximately upright tubular carrier receiving sections of the drawn sheet, means automatically shifting said carrier from upright to horizontal position with said sections on the under side thereof, and suction devices holding the sections on the carrier during the movement from upright to horizontal position.

7. In a continuous sheet glass drawing machine, a vertically movable normally upright carrier, means imparting vertical movement to said carrier, means turning said carrier from its upright to a horizontal position, means delivering sheet sections to said carrier in its upright position, and suction devices holding said sections on said carrier during its movement from an upright to a horizontal position.

8. In a sheet glass drawing machine, the combination with a receptacle for molten glass and a leer, of means for continuously drawing a sheet of glass, means severing sections of the sheet therefrom during the drawing operation, a carrier transferring the sections as severed to the leer, and means subjecting the sections to pneumatic pressure to hold them on the carrier during the transfer movement.

9. In a sheet glass drawing machine, a vertically reciprocating carrier oscillating on its axis, means imparting said reciprocating and oscillating movements thereto, means delivering sections of glass thereto, and suction devices holding said sections on the carrier, and means breaking the suction and freeing the said sections therefrom.

10. In a sheet glass drawing machine, the combination of receptacle for molten glass from which the glass flows in approximately sheet form vertically downward, drawing mechanism gripping and drawing the sheet downward, scoring devices intermittently scoring the drawn sheet, and suction means for engaging and breaking off the end sheet section below the score, swinging the sheet section over onto a horizontal leer conveyor, and releasing the section so that it may pass into the leer.

11. In a sheet glass drawing machine, the combination of a receptacle for molten glass, sheet drawing mechanism for gripping and drawing a sheet from the receptacle, scoring devices for intermittently scoring the drawn sheet to form successive sheet sections, suction devices for engaging and breaking off the end sheet section and carrying it into position for delivery to a horizontal leer, and a leer conveyor for carrying the sheet into the leer when released by the suction devices.

In testimony whereof I have signed this specification.

ROBERT P. CALLARD.